United States Patent
Aker (10) Patent No.: US 10,803,607 B2
(45) Date of Patent: Oct. 13, 2020

(54) SYSTEMS AND METHODS TRACKING OBJECTS WITHIN A VENUE USING A SYMBOLOGY ACCELERATOR

(71) Applicant: Zebra Technologies Corporation, Lincolnshire, IL (US)

(72) Inventor: Wynn L. Aker, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/134,460

(22) Filed: Sep. 18, 2018

(65) Prior Publication Data
US 2020/0090348 A1 Mar. 19, 2020

(51) Int. Cl.
*G06T 7/292* (2017.01)
*G06Q 30/06* (2012.01)
*G06T 7/73* (2017.01)
*H04N 5/247* (2006.01)
*H04L 29/08* (2006.01)

(52) U.S. Cl.
CPC ......... *G06T 7/292* (2017.01); *G06Q 30/0635* (2013.01); *G06T 7/73* (2017.01); *H04N 5/247* (2013.01); *G06T 2207/30232* (2013.01); *H04L 67/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,478,030 | B1 * | 10/2016 | Lecky | G06Q 10/08 |
| 10,373,322 | B1 * | 8/2019 | Buibas | G06K 9/00201 |
| 2009/0127327 | A1 * | 5/2009 | Rani | G06Q 10/08 235/375 |
| 2012/0216696 | A1 * | 8/2012 | Niedermeyer | F42C 13/047 102/427 |
| 2015/0364021 | A1 * | 12/2015 | Ur | G08B 21/02 340/573.1 |
| 2018/0350218 | A1 * | 12/2018 | Jeon | G06K 7/10475 |

* cited by examiner

*Primary Examiner* — Janese Duley
(74) *Attorney, Agent, or Firm* — Yuri Astvatsaturov (57) ABSTRACT

An apparatus, system and method for tracking objects within a venue. A plurality of detector stations are disposed throughout the venue. Each detector station includes an imaging assembly, a transceiver, and a symbology accelerator having least one processor. The processor is configured to obtain image data captured by the imaging assembly and analyze the image data to detect one or more objects. Each of the one or more objects includes a symbol indicative of an object identifier. The processor is configured to decode each of the symbols to obtain the respective identifier and associate the detected objects or respective symbols with a respective physical location within the venue. For each of the one or more objects, the processor is configured to transmit, via the transceiver to a remote server, at least one data packet including the respective physical location and the identifier for the object.

20 Claims, 6 Drawing Sheets

SYSTEMS AND METHODS TRACKING OBJECTS WITHIN A VENUE USING A SYMBOLOGY ACCELERATOR

BACKGROUND OF THE INVENTION

Frictionless shopping enables customers to purchase objects from a store without the inconvenience of interacting with a payment station (e.g., a cashier or self-checkout station). In a venue that supports frictionless shopping, customers and objects are monitored and tracked by a network of cameras disposed throughout the venue. When the network of cameras detects that a customer has left the venue with an object for sale, the frictionless shopping system automatically processes payment for the object.

This network of cameras produces a large volume of image data that must be analyzed to support the frictionless shopping capabilities. A centralized processing unit that performs the tracking operations relied upon for frictionless shopping often struggles to process the image data fast enough. This delay in processing the image data causes the tracking systems to be less accurate and potentially fail to recognize events where an individual picks up an object for sale and/or leaves the venue.

Accordingly, there is a need for systems and methods for tracking objects at a venue using a symbology accelerator.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the present disclosure include an apparatus for tracking objects within a venue. The apparatus includes a plurality of detector stations disposed throughout the venue. Each detector station includes an imaging assembly, a transceiver, and a symbology accelerator having least one processor. The symbology accelerator of each detector station is configured to obtain image data captured by the imaging assembly and analyze the image data to detect one or more objects within a field of view of the imaging assembly. Each of the one or more objects includes a symbol indicative of an identifier for the object. The symbology accelerator is further configured to decode each of the respective symbols on the one or more objects to obtain the respective identifier and to associate at least one of (i) the detected one or more objects and (ii) the respective symbol on the detected one or more objects with a respective physical location within the venue. For each of the one or more objects, the symbology accelerator is configured to transmit, via the transceiver to a remote server, at least one data packet including the respective physical location and the identifier for the object.

In some embodiments, the field of view for the imaging assemblies within the detector stations are configured to be angled downward toward a ground plane of the venue (e.g., the floor or a shelf). As a result, the imaging assemblies view the objects from a downward angle, as opposed to an eye-level angle at which conventional barcode scanners and/or individuals typically view the objects. Accordingly, to improve to perceptibility of the respective symbols by the imaging assemblies, the symbols disposed on the objects are configured to be more perceptible from the downward angle than an eye-level angle (e.g., the aspect ratio of the symbols are elongated in the vertical direction, causing the geometric perspective distortion when viewed from above to appear as if viewed front-on). Similarly, objects may also be viewed from a side perspective, causing symbol distortion in the lateral direction. In this case, symbols are created that have altered aspect ratios in the horizontal direction as well as vertical, in order to make viewing more easily accomplished regardless of the exact perspective as viewed by the imaging assemblies.

In some embodiments, a plurality of detector stations are disposed throughout the venue and operatively connected to a controller. For example, the controller may be configured to support a frictionless shopping experience where customers do not need to interact with a payment station to purchase objects at a venue. Accordingly, in some additional or alternative embodiments, the controller may include at least one processor configured to monitor a physical location of a plurality of individuals at the venue. The controller is configured to receive, from the detector stations, a data packet indicating that a particular object has moved. Responsive to receiving the data packet, the controller is configured to identify a particular individual of the plurality of individuals closest to the physical location of the particular object and associate the particular individual with the particular object.

As part of supporting the frictionless shopping experience, in some embodiments, the controller is configured to be operatively connected to a database that stores records of individuals at the venue that include a location of the individual and a list of objects associated with the individual. Accordingly, when the controller receives an indication that a particular object has moved, the controller is configured to query the individual database using the physical location associated with the particular object to identify the individual closest to the particular object. More particularly, the controller is configured to update the record for the individual closest to the particular object to include the particular object in the list of objects associated with the individual.

To reduce the processing burden on the controller, the detector stations are configured to perform edge processing techniques. For example, the detector stations are configured to analyze the image data to detect that at least one of (i) a particular object of the one or more detected objects and (ii) a respective symbol of the particular object has moved from the associated respective physical location. To detect that the particular object or respective symbol has moved, the detector station, in some embodiments, is configured to detect an absence of the particular object or respective symbol at the associated physical location. Additionally or alternatively, the detector station is configured to detect the presence of a respective symbol of another object at a physical location substantially behind the physical location of the particular object.

Regardless, in one embodiment, after detecting that the particular object or respective symbol has moved, the detector station transmits an indication to the controller that the particular object or respective symbol has moved. Consequently, instead of processing the entire set of raw image data collected by all detector stations, the controller is able to only analyze the indications that a particular object or respective symbol has moved to detect that an object is in motion. For example, in scenarios where multiple individuals are near the particular object that has moved, relying on the closest individual is not always accurate. Thus, in these scenarios, the controller may be configured to initiate monitoring of a region proximate the physical location of the particular object to determine the individual associated with the particular object. Accordingly, the controller is configured to analyze the received image data from the detector station that transmitted the indication (and/or the image data generated at another detector station) to determine the individual associated with the particular object. For example, the controller may identify an individual following a similar path as the object or identify that the object is now located in a shopping cart associated with an individual.

Figure 1:
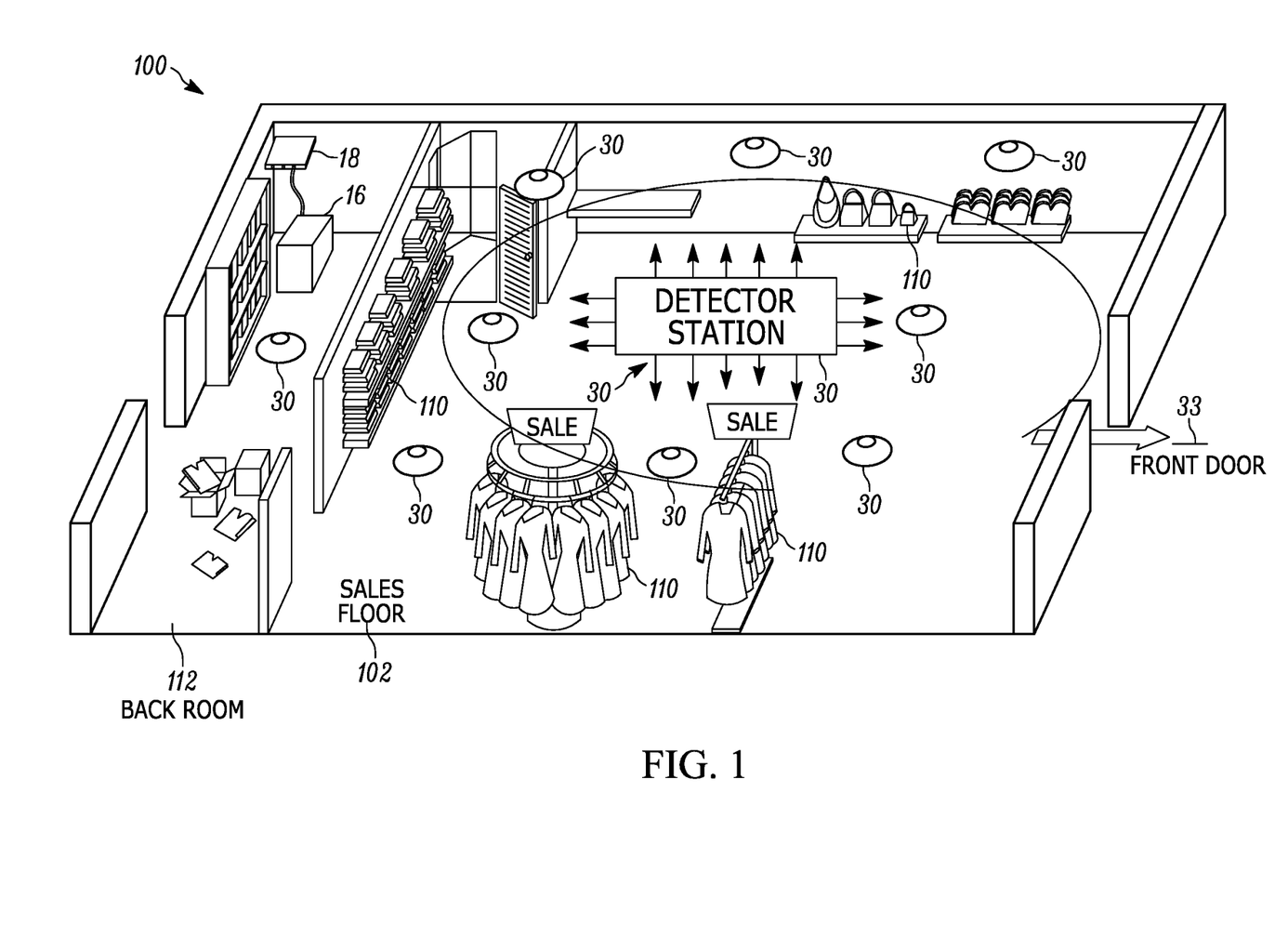
FIG. 1 is a perspective view, as seen from above, of a venue illustrating an arrangement for which a frictionless shopping system within the venue is deployed to facilitate tracking objects and individuals, in accordance with an example.

FIG. 1 is a perspective view, as seen from above, of a venue 100 illustrating an arrangement for which a frictionless shopping system within the venue 100 is deployed. Although the example venue 100 is a retail venue, other types of venues (such as an airport, a stadium, a performance center, a museum, and so on) that include objects for sale are envisioned. In the example embodiment of FIG. 1, the venue 100 includes a backroom 112 that has a centralized controller 16. In other embodiments, the centralized controller 16 may be located off-venue. The centralized controller 16 may be operated by store personnel and/or personnel associated with the frictionless shopping system.

The centralized controller 16 may comprise a networked host computer or server. The centralized controller 16 may be connected to a plurality of detector stations 30 positioned throughout the venue 100 via the network switch 18. As further described herein, the detector stations 30 include an imaging assembly configured to detect symbols (not depicted) embedded on objects 110 (such as packaging, cans, clothing, books, toys, or any product or other object available for purchase at a venue). The detector stations 30 may include other sensors in addition to the imaging sensor, for example, radio frequency identification (RFID) sensors, ultrasonic emitters, etc.

Each of the detector stations 30 may either be in either wired or wireless electronic communication with centralized controller 16. In some embodiments, the detector stations 30 may be connected via Category 5 or 6 cables and use the Ethernet standard for wired communications. In other embodiments, the detector stations 30 may be connected wirelessly, using built-in wireless transceiver, and may use the IEEE 802.11 (WiFi) and/or Bluetooth standards for wireless communications. Other embodiments may include detector stations 30 that use a combination of wired and wireless communication. Regardless, the detector stations 30 and the centralized controller 16 are configured to generate and exchange data packets with one another over the wired and/or wireless connection.

According to aspects of the disclosure, the detector stations 30 may also provide wireless connectivity to communication devices carried by individuals at the venue 100. For example, the detector stations 30 may be configured to act as a WiFi hotspot. In some embodiments, the communication device executes an application provided by a venue operator that provides credentials to gain access to the wireless connectivity supported by the detector stations 30. When a communication device is accessing the wireless connectivity, the signal strength of the connection varies between the different detector stations 30. The centralized controller 16 may analyze these variances using, for example, triangulation techniques to determine the location of the communication device as a corresponding individual traverses the venue 100.

As illustrated, the venue 100 includes an egress point, such as the front door 33, used by individuals to leave the premises of the venue 100. Accordingly, the when the centralized controller 16 monitors the location of the individuals at the venue 100, the centralized controller 16 may determine that the individual has crossed an egress point of the venue 100. In this scenario, to complete the frictionless shopping experience, the centralized controller 16 identifies any objects carried by the individual and automatically processes a purchase event for the objects.

Figure 2:
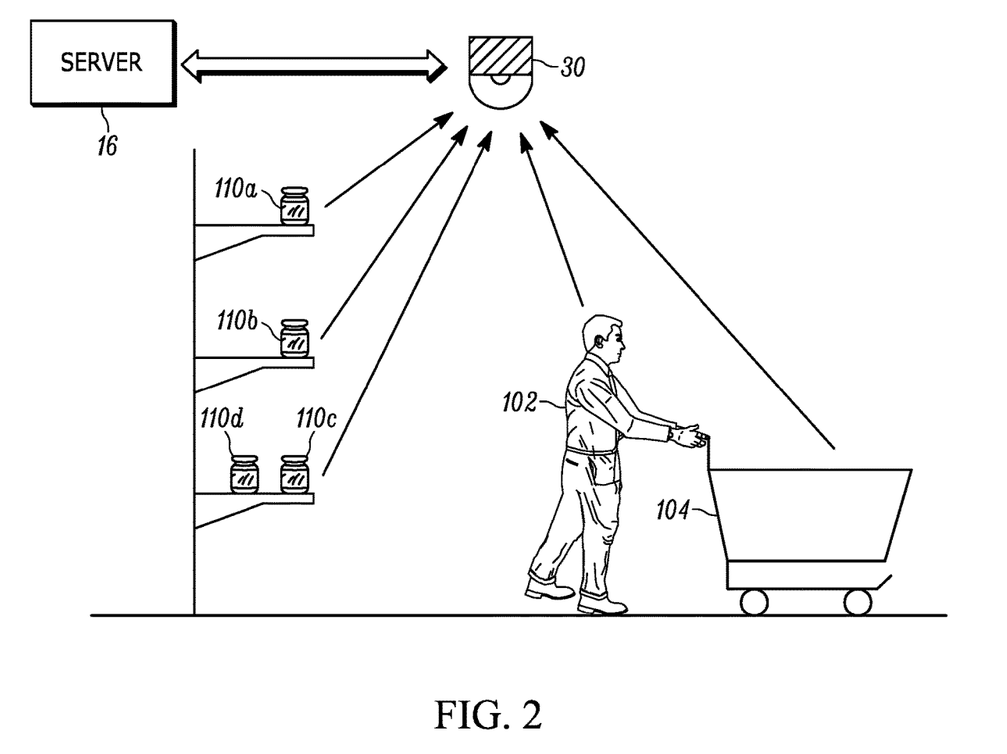
FIG. 2 is a perspective view illustrating a scenario in which an individual at the venue of FIG. 1 is shopping.

FIG. 2 is a perspective view illustrating a scenario in which an individual 102 at the venue of FIG. 1 is shopping. In the example illustrated in FIG. 2, the individual 102, shopping cart 104, and objects 110 are within the field of view of the imaging assembly of the detector station 30. Accordingly, the imaging assembly of the detector station 30 generates image data indicative of each of the individual 102, shopping cart 104, and objects 110.

Figure 3:
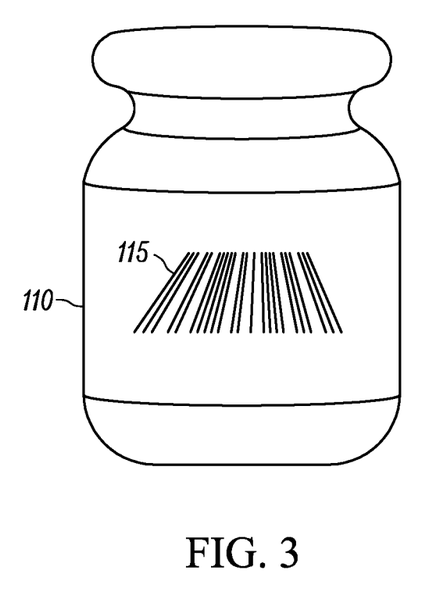
FIG. 3 is a perspective view illustrating a symbol on an object tracked by the frictionless shopping system of FIG. 1.

In one embodiment, to track the objects 110, the symbology accelerator of the detector station 30 analyzes the image data to detect a symbol included on the objects 110. With simultaneous reference to FIG. 3, illustrated is an example symbol 115 included on an object 110. In the illustrated example, the symbol is a barcode; however, other symbols may be utilized instead. For example, the symbol may be a watermark that uniquely identifies the object 110. It should be appreciated that some watermarks, such as those used by Digimarc™, may not be perceptible to humans.

As illustrated in FIG. 2, the detector station 30 is positioned above the objects 110. Accordingly, the field of view for the imaging assembly of the detector station 30 is angled downward towards a ground plane of the venue (e.g., the floor) to be able to capture image data representative of the objects 110. When viewed from this downward field of view, symbols that are optimized for eye-level viewing angles are skewed. That is, symbols that are generally scanned by handheld scanners or conventional checkout stations are not configured to be viewed at the downward angles at which the detector station 30 captures image data.

In the embodiment illustrated by FIG. 3, the symbol 115 is configured to be more perceptible by an imaging assembly that has a downward field of view, than an eye-level viewing angle. As illustrated, the symbol 115 has a wider bottom portion and a narrow upper portion. Thus, when the imaging assembly of the detector station 30 captures image data of the object 110, the skew of symbol 115 as included on the object cancels out the skew introduced by the downwardly angled field of view to produce a set of image data that has less or no skew. Accordingly, the symbology accelerator in the detector stations 30 is able to more accurately decode the information included in the symbol 115.

In some scenarios, the individual 102 carries a communication device configured to execute an application associated with the venue 100. Accordingly, the centralized controller 16 is able to track the location of the individual 102 as the individual 102 traverses the venue 100. For example, the centralized controller 16 may perform triangulation and/or image data analysis to track the individual 102. As described below, the centralized controller 16 may be operatively connected to an individual database. In these embodiments, the centralized controller 16 generates a record corresponding to the individual 102 in the individual database upon detecting the presence of the individual 102 at the venue 100. As the individual 102 traverses the venue 100, the centralized controller 16 updates the record corresponding to the individual 102 to indicate a current location of the individual 102 at the venue 100 and a list of objects picked up by the individual 102 and/or placed in the shopping cart 104. It should be appreciated due to processing delays, the "current" location may not represent the precise location at which the individual 102 is actually located.

Figure 4:
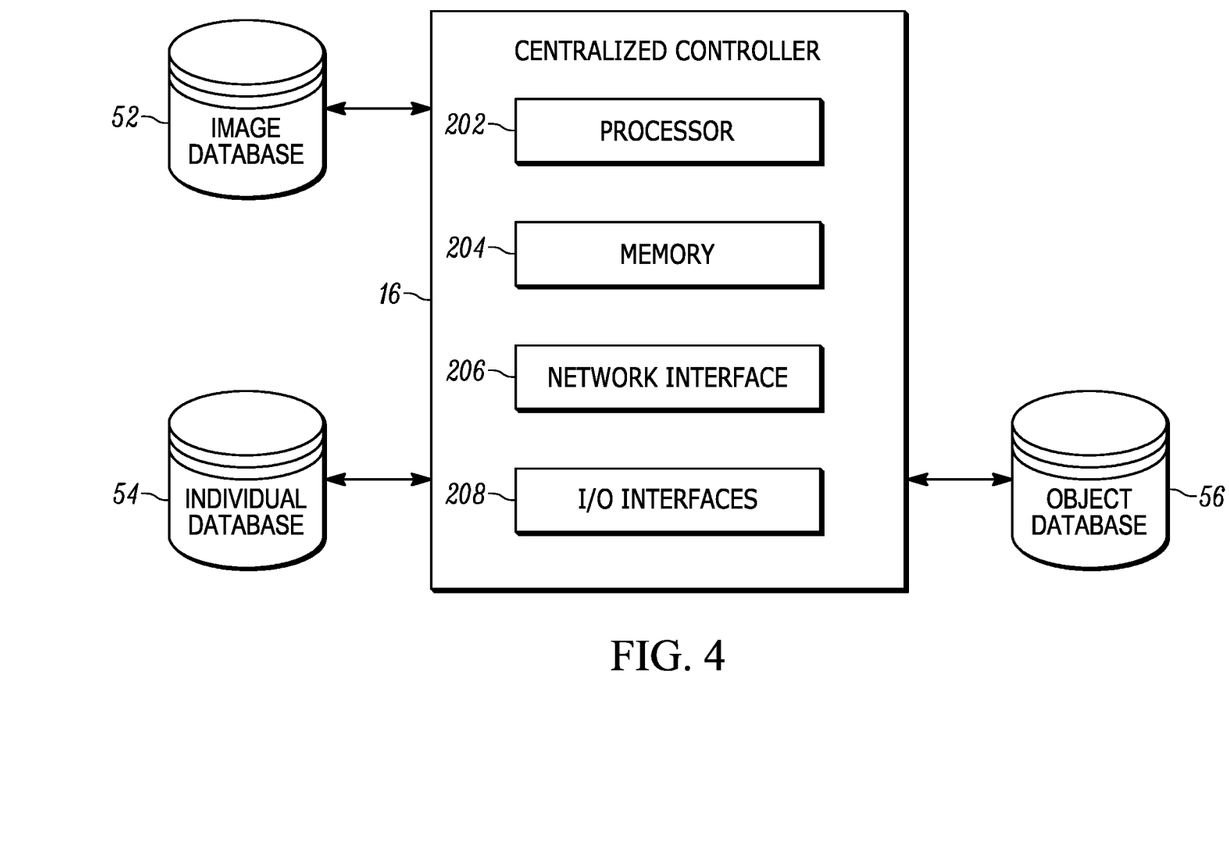
FIG. 4 is a block diagram representative of an embodiment of a centralized controller of FIG. 1.

FIG. 4 is a block diagram representative of an embodiment of centralized controller 16 of FIG. 1. The centralized controller 16 is configured to execute computer instructions to perform operations associated with the systems and methods as described herein, for example, implement the example operations represented by the block diagrams or flowcharts of the drawings accompanying this description. The centralized controller 16 may implement enterprise service software that may include, for example, Restful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. As described below, the centralized controller 16 may be specifically configured for performing operations represented by the block diagrams or flowcharts of the drawings described herein.

The example centralized controller 16 of FIG. 4 includes a processor 202, such as, for example, one or more microprocessors, controllers, and/or any suitable type of processor. The example centralized controller 16 of FIG. 4 further includes memory (e.g., volatile memory or non-volatile memory) 204 accessible by the processor 202, for example, via a memory controller (not shown). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the centralized controller 16 to provide access to the machine-readable instructions stored thereon.

The example centralized controller 16 of FIG. 4 further includes a network interface 206 to enable communication with other machines via, for example, one or more computer networks, such as a local area network (LAN) or a wide area network (WAN), e.g., the Internet. The example network interface 206 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example centralized controller 16 of FIG. 4 includes input/output (I/O) interfaces 208 to enable receipt of user input and communication of output data to the user, which may include, for example, any number of keyboards, mice, USB drives, optical drives, screens, touchscreens, etc.

The example centralized controller 16 of FIG. 4 is operatively connected to an image database 52 that stores image data of the venue 100. To this end, the example centralized controller 16 stores image data received from the detector stations 30 at the image database 52. Additionally, the centralized controller 16 is operatively connected to an individual database 54 that stores records associated with individuals located at a venue 100. The records include indications of a tracked location of the individual, one or more objects associated with the individual, a communication device address, a user profile, set of image data indicative of the individual, and/or other information associated with individuals. As part of its frictionless shopping capabilities, the centralized controller 16 monitors the location of the individuals to determine that a particular individual has left the venue 100 or is about to leave the venue 100. In response, the centralized controller 16 processes a purchase event for any objects associated with the individual, for example, by utilizing a form of payment included in the user profile.

The example centralized controller 16 of FIG. 4 is also operatively connected to an object database 56 that includes records for a plurality of objects located on the premises of the venue 100. The record of a particular object may include indications of a latest location for the object (such as a physical location associated with the particular object as determined by a symbology accelerator of a detector station 30), an object profile that indicates, for example, a price of the object and/or a universal product code (UPC) or other unique identifier of the specific object or object type, an associated individual, a set of image data indicative of the object, and so on. In some embodiments, the centralized controller 16 creates a new record in the object database 56 in response to receiving a data packet at the network interface 206 indicating the presence of a newly detected symbol and the corresponding identifier. To populate the new record, the centralized controller 16 utilizes the identifier to determine additional information about the object. In one example, the centralized controller 16 queries an inventory database (not depicted) to obtain information relating to object price, manufacturer, quantity, etc.

In some embodiments, the centralized controller 16 is configured to receive, via the network interface, an indication that a particular object has moved including an object identifier for the object. In response, the centralized controller 16 utilizes the object identifier to query the object database 56 to determine a physical location of the object. Using the determined physical location, the centralized controller 16 then queries the individual database 54 to determine an individual closest to the physical location. The centralized controller 16 then updates the record in the individual database 54 to associate the determined individual with the object that moved.

It will be appreciated that although FIG. 4 illustrates the image database 52, the individual database 54, and the object database 56 as being external to the example centralized controller 16, other example centralized controllers 16 may internally include the image database 52, the individual database 54, and/or the image database 56. Additionally, although the image database 52, the individual database 54, and the object database 56 are depicted as separate entities, in some embodiments, any combination of the image database 52, the individual database 54, and the object database 56 are combined into a single entity.

Figure 5:
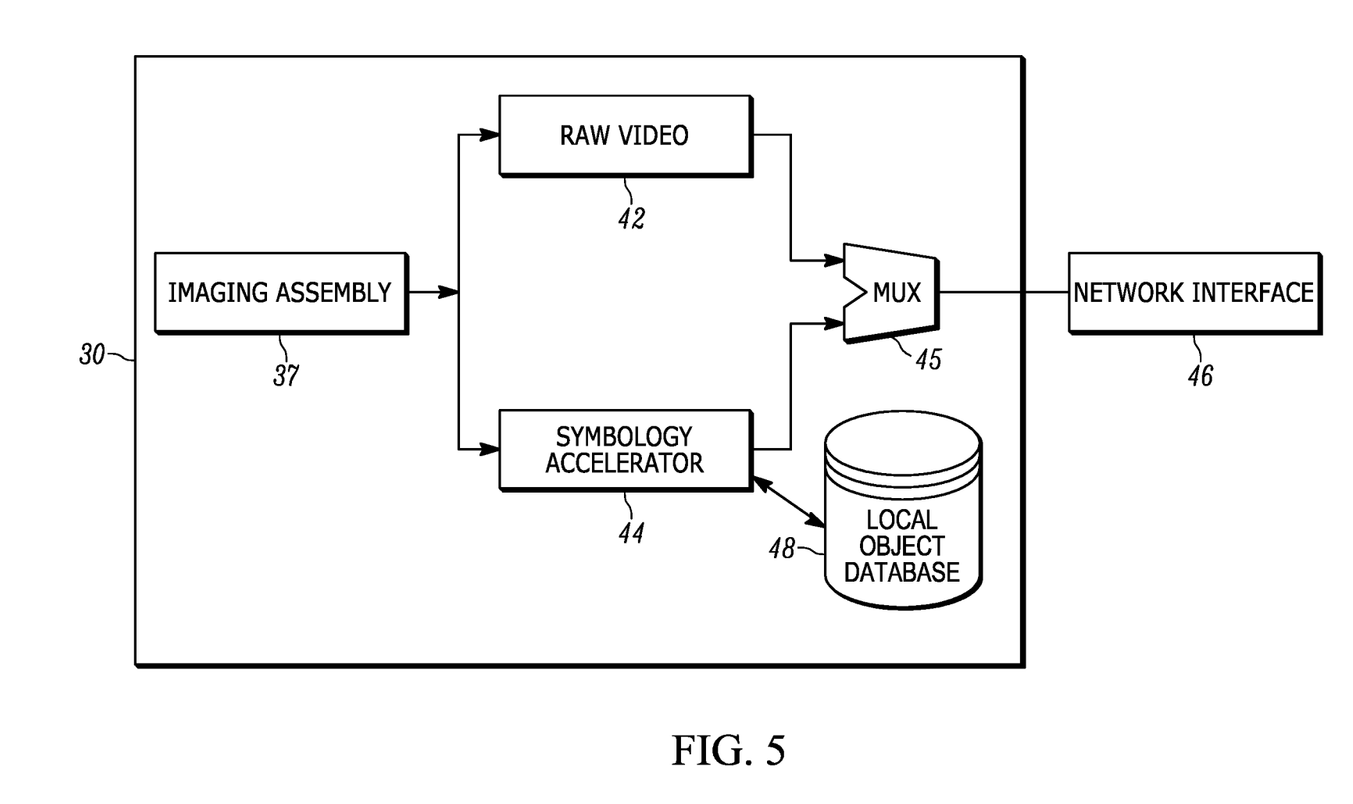
FIG. 5 is a block diagram illustrating an example implementation of a detector station, including several detectors, as may be used in the venue of FIG. 1, in accordance with an example embodiment.

FIG. 5 is a block diagram illustrating an example embodiment of a detector station 30. In the illustrated example, the detector station 30 includes an imaging assembly 37. The imaging assembly 37 may be a camera and include any known imaging components for capturing image data. For example, the imaging assembly 37 may include an array of image sensors configured to detect reflections of light that pass through a lens system. In some embodiments, the imaging assembly 37 includes an illumination assembly configured to emit light at a particular frequency or range of frequencies. Additionally or alternatively, the imaging assembly 37 may include one or more filters configured to filter the reflected light before and/or after it is sensed by the image sensor array.

The example detector station 30 is configured to transmit any image data captured by the imaging assembly 37 to the centralized controller 16. Accordingly, the image data is passed to the raw video processing unit 42 to convert the raw video into a format more suitable for transmission to the centralized controller 16. For example, the raw video processing unit 42 may be configured to compress the raw video data using any known video compression algorithm. The raw video processing unit 42 then generates a data packet to transmit the image data to the centralized controller 16 via a network interface 46 which is paired to the network interface 206 of the centralized control 16.

Additionally, the example detector station 30 includes a symbology accelerator 44 that includes one or more processor that execute a set of instructions configured to analyze image data captured by the imaging assembly 37. More particularly, the symbology accelerator 44 is configured to analyze the image data to detect the presence of any symbols within a field of view (FOV) of the imaging assembly 37. Upon detecting the presence of the symbol, the symbology accelerator 44 determines a physical location of the symbol. In one example, the physical location is an <x,y,z> coordinate based on a coordinate system for the venue 100. In another example, the physical location is a geospatial positioning system (GPS) or other positioning system in combination with an indication of object elevation.

In one scenario, to determine the physical location, the symbology accelerator 44 is programed to store an indication of the physical location of the respective detector station 30 and an angle at which the FOV of the imaging assembly 37 is angled with respect to the coordinate system for the venue 100. By analyzing the size of the detected symbol, the symbology accelerator 44 is able to estimate a distance from the imaging assembly 37 the symbol is located. Accordingly, by comparing this distance to the location within the FOV of the imaging assembly 37, the symbology accelerator 44 is able to determine the physical location of the symbol.

In some embodiments, the symbol is in a physical location that is within the FOV of multiple imaging assemblies 37 disposed in different detector stations 30. In these embodiments, the symbology accelerator 44 accesses a detector station map (not depicted) that indicates a range of coordinates within the FOV of imaging assembly 37 at each detector station 30 at the venue 100. Accordingly, if the determined physical location of the symbol is located within the FOV of multiple imaging assemblies 37, the symbology accelerator 44 may compare the image data captured at other detector stations 30 to perform triangulation techniques to determine a physical location based on multiple sets of image data. As a result, the symbology accelerator 44 is able to more accurately determine the physical location of the symbol.

After detecting the presence of a symbol, the symbology accelerator 44 decodes the symbol to obtain an identifier of the object on which the symbol is located. For example, the identifier may be a universal product code (UPC) or other unique identifier of the object type or the particular object. The symbology accelerator 44 then creates a record in a local object database 48 that associates the determined physical location and the symbol or object identifier. By repeating this process for at least some, and preferably all, symbols within the FOV of the imaging assembly 37, the symbology accelerator 44 develops an accurate list of all symbols or objects and their respective physical locations.

In some embodiments, when the symbology accelerator 44 creates a record in the local object database 48, the symbology accelerator 44 also includes an indication of a region in the FOV of the imaging assembly 37 in which the symbol is located. When the symbology accelerator 44 analyzes the image data captured by the imaging assembly 37, the symbology accelerator 44 is able to reference this indication to determine whether the symbol is a new symbol or one already tracked by the symbology accelerator. Thus, the symbology accelerator 44 only generates a new record in the local object database 48 when a new symbol is detected (e.g., when an object having a tracked symbol is removed enabling the imaging assembly 37 to view a new symbol on an object substantially behind the remove object).

It should be appreciated that the term "new" does not necessarily mean encoding a new object identifier. In one scenario where an object is removed from a shelf, the venue 100 include another object of the same type behind the removed object on the shelf In this scenario, the symbol on the newly exposed object encodes the same object identifier as the symbol on the removed object. Similarly, the venue 100 may include multiple rows of the same object facing the shoppers. Thus, detecting a "new" symbol may refer to detecting a new instance of a symbol previously or currently tracked by the symbology accelerator 44.

In addition to updating the local object database 48, the symbology accelerator 44 also generates an indication of the newly detected symbol and/or the respective object to transmit to the centralized controller 16. The symbology accelerator 44 routes this indication to a multiplexer 45 which appends the indication to a data packet produced by the raw video processing unit 42. For example, the multiplexer 45 may include the indications of the new symbol and the determined physical location as flags included in the header of a data packet that includes the compressed image data in the body. It should be appreciated due to the processing time differences, the data packet to which the indication of the new symbol is appended may include image data other than the image data relied upon by the symbology accelerator 44 to detect the new symbol.

In some embodiments, the symbology accelerator 44 is also configured to detect that a symbol stored at the local object database 48 ("a tracked symbol") has moved (e.g., the object on which the symbol is disposed has been picked up by an individual). In one example, the symbology accelerator 44 detects the presence of a new symbol at a location substantially behind the tracked symbol to determine that the tracked symbol is on an object picked up by an individual. In another example, the symbology accelerator 44 determines that the tracked symbol is not located at the physical location indicated by the record stored at the local database 48. To avoid incorrectly determining that an object has been picked up when an individual (or other object) simply passes in front of a tracked symbol, the symbology accelerator 44 may include a timer or frame count indicative an amount of time the symbol must be absent from the image data before the symbology accelerator 44 determines that the object has in fact been picked up by an individual.

In response to detecting that the symbol has moved, the symbology accelerator 44 transmits an indication that the tracked symbol has moved to the centralized controller 16. Similar to transmitting the indication of the newly detected symbol, the symbology accelerator 44 may route the indication to the multiplexer 45 to append the indication to a data packet that includes image data processed by the raw video processing unit 42. In one example, the multiplexer 45 includes the indication as one or more flags in the header of the data packet.

Figure 6:
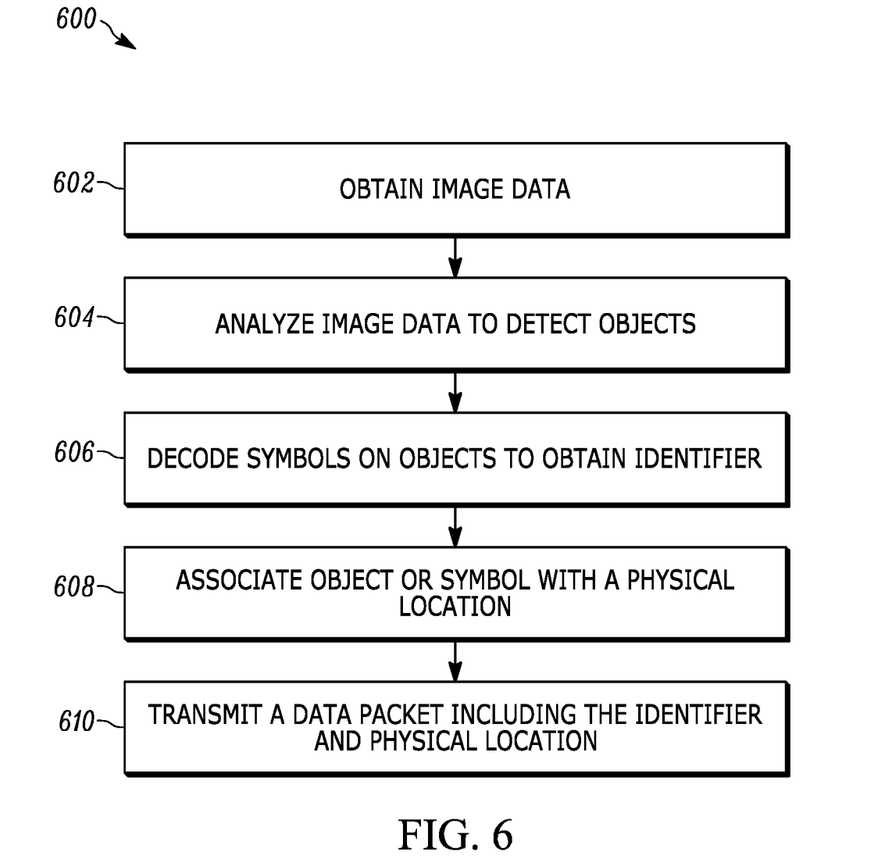
FIG. 6 is a flow chart of a method for tracking objects within a venue, in accordance with an example embodiment.

FIG. 6 is a flow chart of a method 600 for tracking objects at a venue, in accordance with an example embodiment. As described herein, the method 600 may be performed by a symbology accelerator 44 of a detector station 30 disposed at a venue 100. The method 600 may begin at block 602 when the symbology accelerator 44 obtains image data captured by the imaging assembly 37 of the detector station 30.

At block 604, the symbology accelerator 44 analyzes the image data obtained at block 602 to detect one or more objects within the FOV of the imaging assembly 37. More particularly, the symbology accelerator 44 analyzes the image data to detect the presence of any symbols indicated by the image data that are embedded on objects throughout the venue 100. The symbols encode an identifier that identifies the corresponding object. For example, the symbol may encode a UPC that is utilized to identify pricing information for the object such that a remote server (e.g., the centralized controller 16) is able to process a purchase event for the object without the need to obtain the object UPC via a payment station at the venue 100.

At block 606, the symbology accelerator 44 decodes the detected symbols to determine the respective object identifiers encoded by the symbols. In some embodiments, the symbology accelerator 44 determines whether the symbol is not already being tracked by the detector station 30. For example, the symbol may be embedded on an object that is located behind another object that was just picked up by a customer. In another example, a venue operator restocks the objects and/or discards any expired objects while the store is closed. In this example, prior to opening the venue 100 to customers again, the symbology accelerator 44 is configured to discard prior records of tracked symbols and begin tracking symbols associated with the newly stocked objects.

At block 608, the symbology accelerator 44 associates each newly detected object or symbol with a physical location at the venue 100. The symbology accelerator 44 determines the physical location based on a location of the symbol within the image data captured by the imaging assembly 37 and known location information associated with the detector station 30. The symbology accelerator 44 then creates a record at an object database (e.g., the local object database 48) that indicates the object identifier and the determine physical location.

At block 610, the symbology accelerator 44 transmits a data packet that indicates the object identifier and the determined physical location to the remote server. In some embodiments, the data packet is configured to include processed image data captured by the imaging assembly 37 in the body of the data packet. In these embodiments, the symbology accelerator 44 may modify the data packet header to indicate the object identifier and physical location. In other embodiments, the symbology accelerator 44 transmits a standalone data packet that does not include any image data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U. S. C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for tracking objects within a venue, the apparatus comprising:
a plurality of detector stations disposed throughout the venue, each detector station including a respective housing that houses an imaging assembly, a transceiver, a local object database, and a respective symbology accelerator having least one processor configured to:
obtain image data captured by the imaging assembly;
analyze the image data to detect one or more symbols carried on respective objects within a field of view of the imaging assembly, each of the one or more symbols being indicative of an identifier for the corresponding object;
decode each of the respective symbols on the one or more objects to obtain the respective identifier;
determine respective physical locations, within the venue, of each of the symbols based on locations of the symbols within the image data;
associate, within the local object database, at least one of (i) the respective identifier of the one or more objects and (ii) the respective symbol on the one or more objects with the respective physical location within the venue; and
for each of the one or more objects, transmit, via the transceiver to a remote server, at least one data packet including the respective physical location and the identifier for the object.

2. The apparatus of claim 1, wherein the field of view for the imaging assembly is configured to be angled downward toward a ground plane of the venue.

3. The apparatus of claim 2, wherein the symbol is configured to be more perceptible from the downward angle of the field of view than an eye-level angle.

4. The apparatus of claim 1, wherein each detector station is configured to:
analyze the image data to detect that at least one of (i) a particular object of the one or more detected objects and (ii) a respective symbol of the particular object has moved from the associated respective physical location.

5. The apparatus of claim 4, wherein to detect that the at least one of the (i) particular object and (ii) the respective symbol of the particular object has moved, each detector station is configured to:
analyze the image data to detect the absence of the at least one of (i) the particular object and (ii) the respective symbol of the particular object at the associated physical location.

6. The apparatus of claim 4, wherein to detect that the at least one of (i) the particular object and (ii) the respective symbol of the particular object has moved, each detector station is configured to:
analyze the image data to detect a respective symbol associated with another object at a physical location substantially behind the physical location of the particular object.

7. The apparatus of claim 1, wherein each of the plurality of detector stations are operatively connected to a controller.

8. The apparatus of claim 7, wherein each detector station is configured to transmit the at least one data packet to the controller.

9. The apparatus of claim 7, wherein each detector station is configured to:
transmit, via the transceiver, the image data to the controller.

10. The apparatus of claim 9, wherein each of the detector stations are configured to:
in response to detecting that at least one of (i) a particular object of the one or more detected objects and (ii) a respective symbol of the particular object has moved, transmit, via the transceiver, an indication that the particular object has moved to the controller.

11. The apparatus of claim 10, wherein the transmission of the indication that the particular object has moved to the controller causes the controller to determine an individual closest to the physical location of the particular object.

12. The apparatus of claim 10, wherein the transmission of the indication that the particular object has moved further causes the controller to associate the individual with the particular object.

13. The apparatus of claim 10, wherein the transmission of the indication that the particular object has moved further causes the controller to initiate monitoring of a region proximate to the physical location of the particular object based on image data generated by an imaging assembly of a detector station of the plurality of detector stations other than the detector station that transmitted the indication that the particular object has moved.

14. A system for tracking objects within a venue populated with a plurality of objects that include a symbol indicative of an object identifier, the system comprising:
a plurality of detector stations disposed throughout the venue, each detector station including a respective housing that houses an imaging assembly, a transceiver, a local object database, and a respective symbology accelerator having one or more processors configured to:
obtain image data captured by the imaging assembly;
analyze the image data to detect one or more symbols carried on respective objects within a field of view of the imaging assembly, each of the one or more symbols being indicative of an object identifier for the corresponding object;
decode each of the respective symbols on the one or more objects to obtain the respective object identifier;
determine respective physical locations, within the venue, of each of the symbols based on locations of the symbols within the image data;
associate, within the local object database, at least one of (i) the respective identifier of the one or more objects and (ii) the respective symbol on the one or more objects with the respective physical location within the venue;
determine that a particular object of the plurality of objects has moved; and
transmit a data packet indicating that the particular object has moved, the data packet indicating the object identifier and the physical location for the particular object; and
a controller operatively connected to the plurality of detector stations, the controller comprising at least one processor configured to:
monitor a physical location of a plurality of individuals at the venue;
receive, from a particular detector station, the data packet indicating that the particular object has moved;
responsive to receiving the data packet, identify a particular individual of the plurality of individuals closest to the physical location of the particular object; and
associate the particular individual with the particular object; and
an individual database operatively connected to the controller and storing records for individuals that indicate (i) a list of objects associated with the individual and (ii) a physical location of the individual at the venue, wherein to identify the particular individual of the plurality of individuals closest to the physical location of the particular object, the controller is further configured to query the individual database using the physical location of the particular object.

15. The system of claim 14, wherein the controller is configured to:
receive image data generated by the imaging assemblies of the plurality of detector stations.

16. The system of claim 15, wherein in response to receiving the data packet, the controller is further configured to:
initiate monitoring of a region proximate to the physical location of the particular object based on image data generated by the imaging assembly of a detector station of the plurality of detector stations other than the detector station from which the controller received the data packet.

17. The system of claim 14, wherein to associate the particular individual with the particular object, the controller is configured to:
update the record for the particular individual to include the particular object in the list of objects.

18. The system of claim 14, wherein the controller is configured to:
detect that the particular individual is no longer located at the venue; and
process a purchase for objects in the list of objects included in the record for the particular individual.

19. The system of claim 14, wherein a field of view for the imaging assembly in each of the plurality of detector stations is configured to be angled downward toward a ground plane of the venue.

20. The system of claim 19, wherein the symbols are configured to be more perceptible from the downward angle of the field of view than an eye-level angle.

* * * * *